April 21, 1959  F. J. HITCHCOCK  2,882,606

HEIGHT GAUGING INSTRUMENT

Filed Sept. 14, 1956

INVENTOR
Frederick J. Hitchcock

United States Patent Office 2,882,606
Patented Apr. 21, 1959

2,882,606

HEIGHT GAUGING INSTRUMENT

Frederick J. Hitchcock, Danvers, Mass.

Application September 14, 1956, Serial No. 609,919

4 Claims. (Cl. 33—172)

My invention relates to an improvement in height gauging instruments and other accurate measuring tools that are used in machine shops to make lines on parts to be machined or to measure distances from a flat surface to a finished machine part. The flat surface used is called a surface plate and most machined parts are inspected while sitting upon such a plate.

My invention has for its main object to provide an improvement in existing gauging of machine parts and to provide an improved tool of this class.

With this object in view I have devised the novel arrangement of elements which I will describe, referring to the accompanying drawing, and which I will define in the appended claims.

In referring to the accompanying drawing:

Fig. 3 shows the construction of a spacer.

Figure 1:
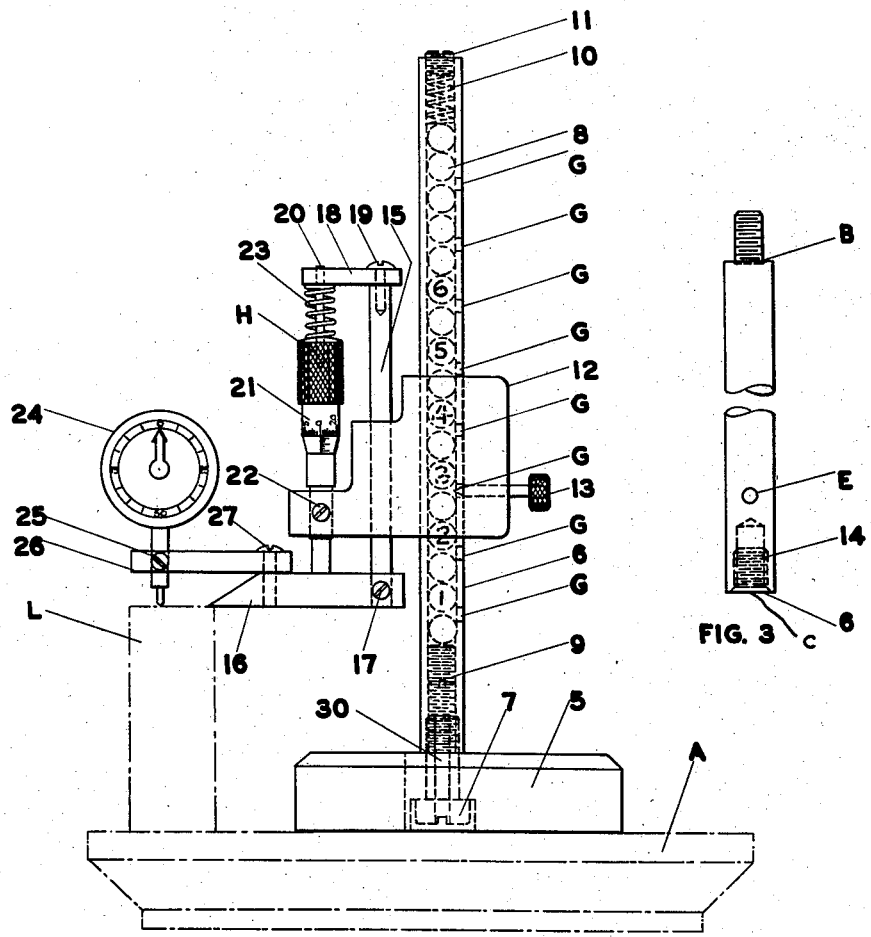
Fig. 1 is a front elevation of one ramification of my invention.

In Fig. 1 I show a height gauge incorporating the features of my invention in which 5 is a base. A, shown in broken lines, is a surface plate on which the work being measured sits. 6 is a tubular member in which there is a series of holes G drilled in its wall and a key way, F, Fig. 2, cut in its entire length. On the front of the tubular member, Fig. 1, I show, stamped on, the graduated Figures 1, 2, 3, 4, 5 and 6 which represent the scale of inches to set the carriage member 12 to. Inside the tubular member 6 is a multiple of balls 8. The balls are held up by an adjusting screw 9 in contact with the lower ball. Above the top ball I have shown a compression spring 10 and, holding the spring in place against the top ball, I show a retaining screw 11. A headed screw 7 is used to attach base 5 to tubular member 6. This headed screw has a hole 30 through its center so as to allow a screw driver to be inserted to adjust the screw 9.

Slidably mounted around the tubular member 6 is the carriage member 12, which is capable of reciprocating motion upward and downward. In the side wall of the carriage member 12 is the plunger 13. This plunger is in the form of a pointed round pin with a knurled section for handling and is a sliding fit in a hole in the side of the carriage member 12, and a loose fit for the holes G, and when pushed in between the balls 8 will cause spring 10 to yield.

When the plunger 13 is positioned between the balls 8 as stated above, a definite measurement is established between the carriage member 12 and the surface plate A.

Slidably mounted on carriage member 12 I show a round shaft 15 which retains the scriber 16 at its lower end. A set screw 17 is used to bind scriber 16 to shaft 15. The scriber is oblong in shape, pointed and very accurately finished on its lower and upper surfaces.

At the upper end of shaft 15 I show an arm 18 retained in position by binding screw 19. In a hole in carriage member 12, and rigidly fastened, I show a micrometer head 21 which is held by set screw 22. In the top end of the micrometer head 21 is a drilled hole H which is a loose fit for pin 20. Pin 20 is a drive fit in arm 18. Compression spring 23 is a loose fit on pin 20 and is interposed between the top of micrometer head 21 and arm 18. A dial indicator 24 is shown held by set screw 25 to arm 26 which is securely held to scriber 16 by binding screw 27.

The dial indicator 24 and the micrometer head 21 are standard tools in the machine trade and can be purchased to read in one-thousandth of an inch or in one ten-thousandth of an inch. The dial indicator may be used alternatively with the scriber and may be removed from the gauge by removing the binding screw 27, Fig. 1.

Before the invention can be used as a height gauge the carriage member 12 must be locked in position with plunger 13 between balls 8 at some integral number of inches measured from the surface plate A to the scriber 16. This must be done with the use of a set block L, shown in dotted lines, Fig. 1, of some definite size.

The final adjustment for the accuracy of the instrument is made (with scriber 16 sitting on top of set block L, plunger 13 between two of the balls 8, micrometer head 21 reading at zero and dial indicator 24 reading at zero) by the final tightening of the screw 22 and the adjusting nut 9.

In use any measurement above the described setting can be read directly from the micrometer head or, in case of measuring a flat surface, any variation from the wanted measurement can be read from the dial indicator.

The balls within the walls of the tube should be exactly one inch in diameter, or equal to one inch in multiple, as any other reading other than one inch above the original setting, or below, will have to be done by moving the carriage member into a different place for the plunger to engage the balls for the desired height.

In the full embodiment of my invention it is practical to make a height gauge to read up to twelve inches in height and, without much greater expense, to have the same gauge read up to any height desired. Where it is desirable to make measurements above twelve inches I have devised a practical method of utilizing the same base and inserting a spacer 14, Fig. 3, interposed between the base 5 and tubular member 6, Fig. 1. I have shown this spacer with a threaded hole in its bottom and a male thread on its upper portion. I have shown the spacer as cylindrical although it could be of any other shape. On the ends B and C the spacer should be very accurately finished 90 degrees from the center line of the spacer. I have shown a hole E, Fig. 3, which may be used to keep the spacer from turning by inserting a rod and holding the same by hand while fastening the spacer to the base by the use of headed screw 7, Fig. 1.

One of the salient features of my invention is the way the scriber always follows the spindle of the micrometer head, either up, or down. This is accomplished by tieing the scriber as shown to the micrometer head through the linkage of the shaft 15, Fig. 1, arm 18, and the compression spring 23. Another feature of this linkage of parts is that the shaft 15 can not turn in a rotary direction on account of being held by arm 18 and anchored by pin 20 into the top of the micrometer head, thus the scriber 16 is always held in a position under the micrometer spindle.

A little study of the drawing, Fig. 1, will show that the tension on the top of the micrometer head caused by the tension spring 23 will exert an equal tension of the scriber against the spindle of the micrometer head. This tension will always be constant regardless of whether the micrometer head is set for a low or a high reading. This nicety of adjustment will allow an inspector to set the micrometer for the reading desired, by turning the thimble of micrometer with his thumb and forefinger and noting any variation in the machined part, on the dial indicator.

In some cases, where a line only is wanted, the dial indicator may be taken off from the scriber by releasing screw 27 and the gauge then used to mark lines on the part to be machined.

Figure 2:
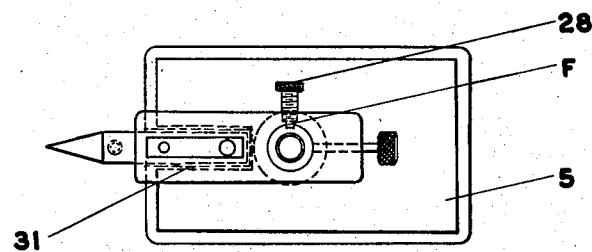
Fig. 2 is a top view of Fig. 1.

In order to make measurements right down to a zero reading, at surface plate level, and above, I have shown a slot 31, Fig. 2, cut in the base 5. This slot is a little larger in width than the scriber.

In Fig. 2 I have shown a thumb screw 28 which has a knob shaped end which fits into keyway F. This screw will keep the carriage member from turning on the tubular member and may be used to temporarily fasten the carriage to the tubular member.

From the above description it can be seen that a 12 inch height gauge can be easily converted into a gauge of any height desired by the adaptor of my spacer. The spacer may be made to a length of 1 foot and a multiple of spacers used to any desired number of feet wanted. This feature and the way the scriber always follows the micrometer spindle, up or down, and when used with, or without, a dial indicator, gives the inspector or machinist a very versatile tool.

What I claim is:

1. A gauging instrument comprising a base with an accurately finished bottom and top surface; an upright tubular member having a female threaded hole in each end and an accurately ground surface on its lower end transversely to the center line and having a keyway cut in the length of its entire surface; a row of balls of circular cross-section within said tubular member, each being in unbroken peripheral contact with the inside walls of said tubular member; holes in said tubular member between said unbroken lines of contact; an adjusting screw fitted to the female threaded hole in the bottom end of said tubular member and engaging the bottom ball; a compression spring within the walls of said tubular member and engaging the top ball; a retaining screw within the walls of said tubular member and engaging the said mentioned tension spring; screw means to bind the lower end of said tubular member to the top surface of said base; a carriage member slidably mounted along the exterior of said tubular member; a pointed plunger mounted for movement longitudinally in said carriage member, said plunger penetrating said holes and selectively engaging the circular peripheries of said balls; a thumb screw mounted longitudinally in the side wall of said carriage member and having a knob pointed end slidably fitted into said keyway in said tubular member; a circular shaft slidably mounted on said carriage member parallel to said tubular member; a scriber attached to the bottom end of said shaft having accurately finished surfaces on its bottom and top; screw means for attaching said scriber to said shaft; a micrometer head securely fitted to said carriage member whose spindle rests upon the top surface of said scriber and having a drilled hole in its upper portion; screw means for fastening said micrometer head to said carriage member; an arm securely attached to the top of said circular shaft and extending outward over the micrometer head, having a hole directly over the said micrometer head; a pin loosely fitted into the hole in the top of said micrometer head and rigidly attached to the hole in said arm; screw means for attaching said arm to said shaft; a compression spring interposed around said pin and between said micrometer head and said arm; an extension arm having two holes drilled near each end; a binding screw fitting into one of the holes in said extension arm and securely attaching said extension arm to said scriber; a dial indicator and screw means for attaching said indicator to said extension arm.

2. A gauging instrument constructed as claimed in claim 1 wherein a spacer is interposed between the top surface of the base and the lower surface of the tubular member, having a female threaded hole in its lower end and a male threaded portion on its upper end and being somewhat greater in diameter than the threaded portion of either end and having each end accurately finished 90° from the center line of said spacer on the ends of the greater portion of said shaft and screw means to attach said spacer to said base and said tubular member to said spacer.

3. A gauging instrument consisting of a base; an upright member having a graduation marking in inches upon its outer surface; means for attaching said upright member to said base; a carriage slidably mounted on said upright member having two holes parallel with said upright member; a thumb screw mounted longitudinally in the side of said carriage member so as to press against and lock said upright member to said carriage member; a shaft slidably mounted in one of the holes in said carriage member; a scriber attached to the bottom end of said shaft having accurately finished bottom and top surfaces; screw means to attach said scriber to said shaft; a micrometer head securely fitted to said carriage member whose spindle rests upon the top surface of said scriber and having a drilled hole in its upper portion; screw means for fastening said micrometer head to said carriage member; an arm securely attached to the top of said circular shaft and extending outward over the micrometer head, having a hole directly over the said micrometer head; a pin loosely fitted into the hole in the top of said micrometer head and rigidly attached to the hole in said arm; screw means for attaching said arm to said shaft; a compression spring interposed around said pin and between said micrometer head and said arm; an extension arm having two holes drilled near each end; a binding screw fitting into one of the holes in said extension arm and securely attaching said extension arm to said scriber; a dial indicator and screw means for attaching said indicator to said extension arm.

4. A gauging mechanism as claimed in claim 3 wherein a spacer is interposed between said base and said upright member and screw means to attach said base to said spacer and said spacer to said upright member.

References Cited in the file of this patent

UNITED STATES PATENTS

| | | |
|---|---|---|
| 1,390,618 | Jennison | Sept. 13, 1921 |
| 2,144,972 | Hirst | Jan. 24, 1939 |
| 2,338,001 | La Vigne | Dec. 8, 1943 |
| 2,675,624 | Kristensen | Apr. 20, 1954 |